US012686215B2

(12) United States Patent
Ozaki

(10) Patent No.: US 12,686,215 B2
(45) Date of Patent: Jul. 21, 2026

(54) PRINTING APPARATUS AND METHOD OF CONTROLLING PRINTING APPARATUS

(71) Applicant: SEIKO EPSON CORPORATION, Tokyo (JP)

(72) Inventor: Kazuma Ozaki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 199 days.

(21) Appl. No.: 18/182,436

(22) Filed: Mar. 13, 2023

(65) Prior Publication Data

US 2023/0286295 A1 Sep. 14, 2023

(30) Foreign Application Priority Data

Mar. 14, 2022 (JP) ................................ 2022-038940

(51) Int. Cl.

| | |
|---|---|
| ***B41J 11/00*** | (2006.01) |
| ***B41J 2/01*** | (2006.01) |
| ***B41J 2/21*** | (2006.01) |
| ***B41J 29/50*** | (2006.01) |
| *B41J 2/165* | (2006.01) |

(52) U.S. Cl.

CPC ........... *B41J 11/00212* (2021.01); *B41J 2/01* (2013.01); *B41J 2/2107* (2013.01); *B41J 2/2114* (2013.01); *B41J 11/00214* (2021.01); *B41J 11/00218* (2021.01); *B41J 29/50* (2013.01); *B41J 2/16508* (2013.01); *B41J 2202/14* (2013.01)

(58) Field of Classification Search

CPC .............. B41J 11/0021; B41J 11/00212; B41J 11/00214; B41J 11/00218; B41J 2/01

See application file for complete search history.

(56) References Cited

U.S. PATENT DOCUMENTS

2002/0140794 A1* 10/2002 Asano .................... B41J 19/142 347/102
2004/0119802 A1* 6/2004 Yoneyama ......... B41J 11/00214 347/102
2010/0156985 A1* 6/2010 Sugahara ........... B41J 11/00214 347/16
2012/0293575 A1* 11/2012 Shimada ............ B41J 11/00214 347/9
2013/0250018 A1 9/2013 Saita
(Continued)

FOREIGN PATENT DOCUMENTS

JP 2009154409 A * 7/2009
JP 2012240338 12/2012
(Continued)

*Primary Examiner* — Douglas X Rodriguez
*Assistant Examiner* — Kendrick X Liu
(74) *Attorney, Agent, or Firm* — WORKMAN NYDEGGER

(57) ABSTRACT

A printing apparatus includes a printing head configured to eject photocurable ink onto a medium, an irradiation portion configured to perform light irradiation of the medium, a mounting portion mounted with the irradiation portion and the printing head in the order from the irradiation portion to the printing head along a first direction, and a driving portion configured to move the mounting portion between a standby position where the printing head stands by and a stop position in the first direction with respect to the standby position. The stop position is a position where the irradiation portion faces the medium.

11 Claims, 10 Drawing Sheets

(56) References Cited

U.S. PATENT DOCUMENTS

| | | | | |
|---|---|---|---|---|
| 2014/0062076 | A1* | 3/2014 | Makuta | B41J 11/00212 283/114 |
| 2020/0207127 | A1* | 7/2020 | Fujisawa | B41J 11/06 |
| 2022/0016916 | A1* | 1/2022 | Saito | B41J 2/2114 |

FOREIGN PATENT DOCUMENTS

| | | |
|---|---|---|
| JP | 2013193349 | 9/2019 |
| JP | 2021-187046 A | 12/2021 |
| JP | 2021194847 | 12/2021 |

* cited by examiner

PRINTING APPARATUS AND METHOD OF CONTROLLING PRINTING APPARATUS

The present application is based on, and claims priority from JP Application Serial Number 2022-038940, filed Mar. 14, 2022, the disclosure of which is hereby incorporated by reference herein in its entirety.

BACKGROUND

1. Technical Field

The present disclosure relates to a printing apparatus and a method of controlling the printing apparatus.

2. Related Art

An inkjet recording device including a printing head and an ultraviolet lamp is known. An inkjet recording device described in JP-A-2004-1326 includes a printing head and an ultraviolet lamp. In the inkjet recording device, the printing head and the ultraviolet lamp are arranged side by side in a main scanning direction on a head carriage. The head carriage moves the printing head and the ultraviolet lamp in the main scanning direction. The printing head and the ultraviolet lamp are moved by the head carriage from a home position via a printing region of a printing medium to a position outside the printing medium.

When the printing head and the ultraviolet lamp arranged in the main scanning direction on the head carriage move to the position outside the printing medium, a width of the printing apparatus in the main scanning direction increases. Thus, the printing apparatus increases in size.

SUMMARY

A printing apparatus according to an aspect of the present disclosure includes a printing head configured to eject photocurable ink onto a medium, an irradiation portion configured to perform light irradiation of the medium, a mounting portion mounted with the irradiation portion and the printing head in order from the irradiation portion to the printing head along a first direction, and a driving portion configured to move the mounting portion between a standby position where the printing head stands by and a stop position in the first direction with respect to the standby position, wherein the stop position is a position where the irradiation portion faces the medium.

A method of controlling a printing apparatus according to an aspect of the present disclosure is a method of controlling a printing apparatus, the printing apparatus including a mounting portion mounted with an irradiation portion and a printing head in order from the irradiation portion to the printing head along a first direction, the printing apparatus being configured to eject photocurable ink onto a medium, the method including moving the mounting portion from a standby position in the first direction, and passing the mounting portion above the medium and stopping the mounting portion at a stop position where the irradiation portion mounted to the mounting portion faces the medium.

DESCRIPTION OF EXEMPLARY EMBODIMENTS

Figure 1:
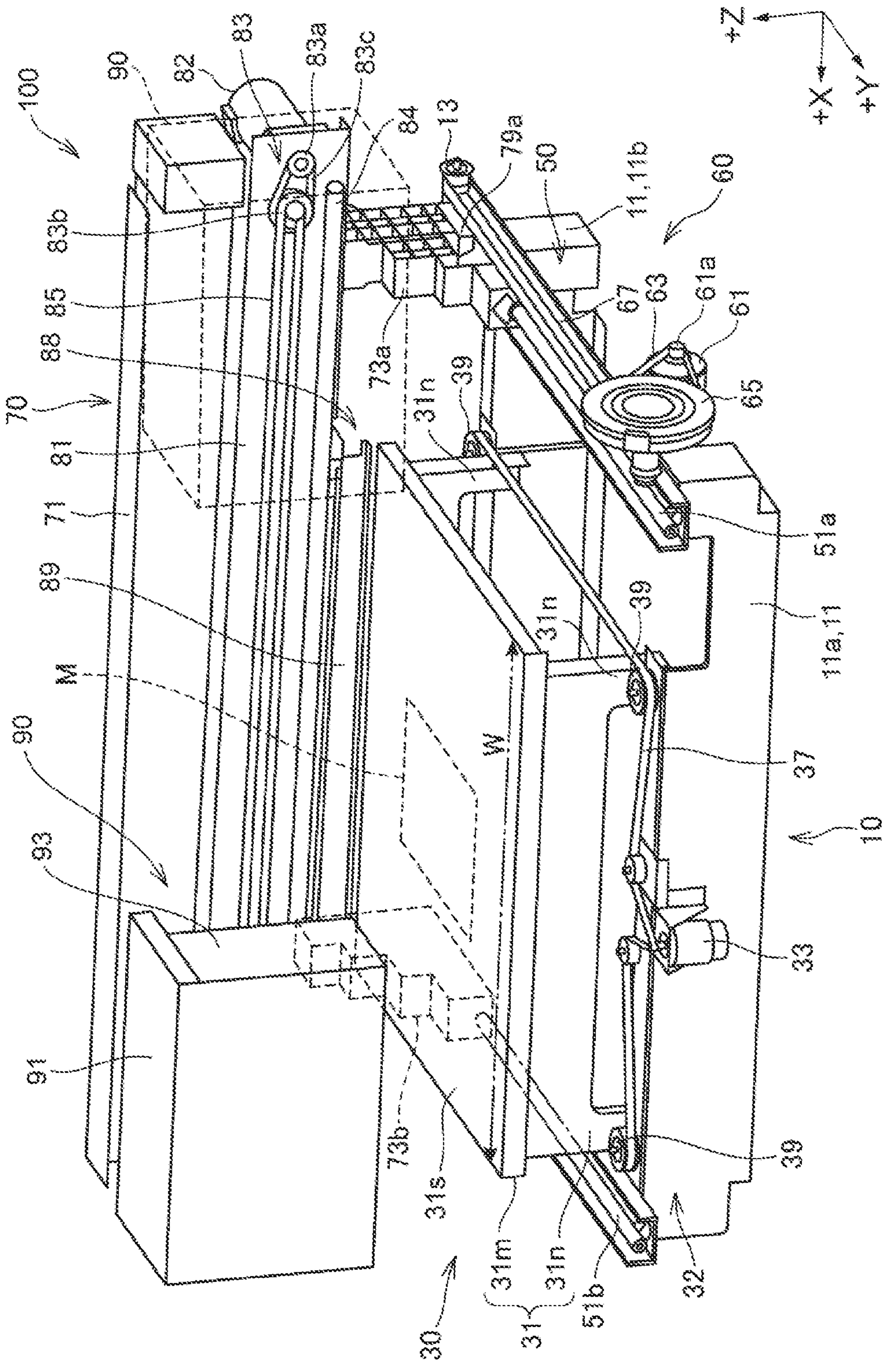
FIG. 1 is a diagram illustrating a perspective view of a printer.

FIG. 1 illustrates a perspective view of a printer 100. The printer 100 ejects a liquid onto a printing medium M to perform printing on the printing medium M. The printing medium M includes a sheet, a cloth, or a three-dimensional object. The sheet is a sheet made of paper or a synthetic resin. The cloth is a nonwoven cloth, a knit, a fabric, or the like. The three-dimensional object includes accessories such as clothes and shoes, commodity products, mechanical components, and other various types of objects. The printing medium M corresponds to an example of a medium. The type of liquid ejected by the printer 100 onto the printing medium M is not limited, and it is only required that the liquid has fluidity. The printer 100 ejects ink of one color or a plurality of colors toward a front surface of the printing medium M to form an image on the printing medium M. The printer 100 corresponds to an example of a printing apparatus.

The plurality of drawings, including FIG. 1, are illustrated using an XYZ-coordinate system. The X-axis, the Y-axis, and the Z-axis are orthogonal to each other. The Z-axis is an axis perpendicular to an installation surface (not illustrated) of the printer 100. The X-axis and the Y-axis are parallel to the installation surface. The X-axis is an axis along a carriage guide shaft 84 described below. The Y-axis is an axis orthogonal to the carriage guide shaft 84. A direction directed upward from the installation surface along the Z-axis represents a +Z direction. A direction directed downward from the installation surface along the Z-axis represents a −Z direction. A direction in which a carriage 91, which will be described below, moves along the carriage guide shaft 84 using as an origin point a home position HP, which will be described below, represents a +X direction. A direction directed toward the home position HP along the carriage guide shaft 84 represents a −X direction. A direction directed from the carriage guide shaft 84 toward a front side of the printer 100 illustrated in FIG. 1 represents a +Y direction. A direction directed from the carriage guide shaft 84 toward a rear side of the printer 100 illustrated in FIG. 1 represents a −Y direction.

The printer 100 includes a main body portion 10 and a moving portion 70. The main body portion 10 is a pedestal fixed to the installation surface of the printer 100. The moving portion 70 moves along the Y-axis with respect to the main body portion 10.

The main body portion 10 movably supports the printing medium M. The main body portion 10 moves the printing medium M along the Z-axis. The main body portion 10 includes a base portion 11, a medium support mechanism 30, and a drive mechanism 50.

The base portion 11 is arranged on the installation surface of the printer 100 and supports each portion of the printer 100 such as the medium support mechanism 30 and the drive mechanism 50. The base portion 11 illustrated in FIG. 1 includes a first base member 11*a*, a second base member 11*b*, and a main body pulley 13. The first base member 11*a* and the second base member 11*b* are arranged side by side along the Y-axis. The main body pulley 13 will be described below.

The medium support mechanism 30 supports the printing medium M. The medium support mechanism 30 adjusts a height along the Z-axis of the printing medium M to be supported. The medium support mechanism 30 includes a table 31 and a height movement mechanism 32.

The table 31 is configured so that the printing medium M can be placed thereon. When the printing medium M is placed on the table 31, the medium support mechanism 30 supports the printing medium M. The table 31 is a pedestal that does not move along the X-axis and the Y-axis. The table 31 includes a medium support portion 31*m* and table leg portions 31*n*.

The printing medium M can be placed on the medium support portion 31*m*. The medium support portion 31*m* is a rectangular flat plate. The printing medium M is placed on a medium support face 31*s* of the medium support portion 31*m*. The medium support face 31*s* is a surface of the medium support portion 31*m* in the +Z direction. A support face length W of the medium support face 31*s* along the X-axis is equal to or substantially equal to the length of the maximum size of the printing medium M along the X-axis. The length of the medium support face 31*s* along the Y-axis may be longer or shorter than the length of the maximum size of the printing medium M along the Y-axis.

The table leg portions 31*n* support the medium support portion 31*m*. The table 31 illustrated in FIG. 1 includes a plurality of the table leg portions 31*n*. The plurality of table leg portions 31*n* are arranged at end portions of the medium support portion 31*m*. The number and the positions of the table leg portions 31*n* can be appropriately set.

The height movement mechanism 32 moves the medium support portion 31*m* along the Z-axis. The height movement mechanism 32 adjusts the height of the printing medium M placed on the medium support portion 31*m*. The height movement mechanism 32 includes a raising and lowering motor 33, a raising and lowering belt 37, and a plurality of raising and lowering mechanisms 39.

The raising and lowering motor 33 generates a driving force for moving the table 31 along the Z-axis. The raising and lowering motor 33 includes an output shaft (not illustrated). The output shaft of the raising and lowering motor 33 rotates under the control of a control unit 110 described below. A rotation direction and a rotation amount of the output shaft of the raising and lowering motor 33 are controlled by the control by the control unit 110. The rotation direction of the output shaft of the raising and lowering motor 33 is a direction in which the table 31 is moved in the +Z direction or a direction in which the table 31 is moved in the −Z direction. The printer 100 operates the raising and lowering motor 33 to move the table 31 in the +Z direction or the −Z direction.

The raising and lowering belt 37 is an annular belt that is wound around the output shaft of the raising and lowering motor 33 and the plurality of raising and lowering mechanisms 39. When the output shaft of the raising and lowering motor 33 rotates, the raising and lowering belt 37 is circularly driven. The raising and lowering belt 37 transmits the rotation of the output shaft of the raising and lowering motor 33 to the plurality of raising and lowering mechanisms 39.

Each of the raising and lowering mechanisms 39 moves the table 31 along the Z-axis. The raising and lowering mechanism 39 is provided on each of the plurality of table leg portions 31*n*. The raising and lowering mechanism 39 includes a ball screw, a nut, and a raising and lowering pulley, for example. The ball screw, the nut, and the raising and lowering pulley are not illustrated. The ball screw is arranged along the Z-axis. The ball screw is rotatably supported by the base portion 11. The nut is threadedly engaged with the ball screw. The nut is fixed to the table leg portion 31*n*. The raising and lowering pulley is fixed to an upper portion of the ball screw. The raising and lowering pulley engages with the raising and lowering belt 37. The rotation of the output shaft of the raising and lowering motor 33 is transmitted to the raising and lowering pulley via the raising and lowering belt 37. When the raising and lowering pulley rotates, the ball screw rotates. By the rotation of the ball screw, the nut and the table leg portion 31*n* move along the Z-axis.

The drive mechanism 50 moves the moving portion 70 along the Y-axis. The drive mechanism 50 includes a first guide shaft 51*a*, a second guide shaft 51*b*, and a frame driving portion 60.

The first guide shaft 51*a* and the second guide shaft 51*b* guide the movement of the moving portion 70 along the Y-axis. The first guide shaft 51*a* and the second guide shaft 51*b* stretch from the first base member 11*a* to the second base member 11*b*. The first guide shaft 51*a* and the second guide shaft 51*b* are shaft members arranged along the Y-axis. The first guide shaft 51*a* is fixed to an end position of the base portion 11 in the −X direction. The second guide shaft 51*b* is fixed to an end position of the base portion 11 in the +X direction.

The frame driving portion 60 includes a frame moving motor 61, a driving belt 63, a speed change mechanism 65, and a transmission belt 67. The frame driving portion 60 illustrated in FIG. 1 is arranged at a position in the −X direction of the base portion 11, but may be arranged at a position in the +X direction. The frame driving portion 60 may be arranged at a position in the −X direction.

The frame moving motor 61 generates a driving force for moving the moving portion 70 along the Y-axis. The frame moving motor 61 includes a rotary shaft 61*a*. The frame moving motor 61 rotates by the control of the control unit 110 described below. A rotation direction and a rotation amount of the rotary shaft 61*a* of the frame moving motor 61 are controlled by the control unit 110. The rotation direction of the rotary shaft 61*a* of the frame moving motor 61 is a direction in which the moving portion 70 is moved in the +Y direction and a direction in which the moving portion 70 is moved in the −Y direction. The printer 100 operates the frame moving motor 61 to move the moving portion 70 in the +Y direction or the −Y direction.

The driving belt 63 transmits the driving force generated by the frame moving motor 61 to the speed change mechanism 65. The driving belt 63 is an annular belt stretching from the rotary shaft 61*a* of the frame moving motor 61 to the speed change mechanism 65.

The speed change mechanism 65 changes the speed of rotation of the rotary shaft 61*a*. The speed change mechanism 65 includes a first pulley and a second pulley, for example. The first pulley and the second pulley are not illustrated in detail. The driving belt 63 is wound around the first pulley. The transmission belt 67 is wound around the second pulley. The speed change mechanism 65 rotates the second pulley by a driving force transmitted from the driving belt 63 to the first pulley. The second pulley drives the transmission belt 67. The speed change mechanism 65 transmits the driving force of the frame moving motor 61 to the transmission belt 67 at a deceleration ratio corresponding to a ratio between a diameter of the first pulley and a diameter of the second pulley.

The transmission belt 67 transmits the driving force to the moving portion 70. The transmission belt 67 is an annular belt stretching from the speed change mechanism 65 to the main body pulley 13. The main body pulley 13 is arranged in the second base member 11*b*. The main body pulley 13 is installed freely rotatable with respect to the second base member 11*b*. The transmission belt 67 is arranged along the first guide shaft 51*a*.

The moving portion 70 moves with respect to the printing medium M. The moving portion 70 moves along the Y-axis with respect to the printing medium M. The moving portion 70 includes a main frame 71 and a recording portion 90.

The main frame 71 is a plate member arranged along the X-axis. The main frame 71 moves along the Y-axis. A length of the main frame 71 along the X-axis is longer than a length of the base portion 11 along the X-axis. The main frame 71 includes a first leg portion 73*a*, a second leg portion 73*b*, a carriage support frame 81, a carriage driving motor 82, a transmission mechanism 83, the carriage guide shaft 84, and a carriage driving belt 85.

The first leg portion 73*a* and the second leg portion 73*b* fix and support the main frame 71. The first leg portion 73*a* and the second leg portion 73*b* support the main frame 71 at positions in the −Z direction of the main frame 71.

The first leg portion 73*a* is arranged at a position in the −X direction of the main frame 71. The first leg portion 73*a* is fitted into the first guide shaft 51*a*. The first leg portion 73*a* is movable along the first guide shaft 51*a*. The first leg portion 73*a* includes a first belt coupling portion 79*a*. The first leg portion 73*a* is fixed to the transmission belt 67 via the first belt coupling portion 79*a*. When the transmission belt 67 is circularly driven, the driving force is transmitted to the first leg portion 73*a* via the first belt coupling portion 79*a*. The driving force transmitted to the first leg portion 73*a* causes the moving portion 70 to move along the Y-axis.

The second leg portion 73*b* is arranged at a position in the +X direction of the main frame 71. The second leg portion 73*b* is fitted into the second guide shaft 51*b*. The second leg portion 73*b* is guided by the second guide shaft 51*b*. The second leg portion 73*b* is movable in the +Y direction and the −Y direction along the second guide shaft 51*b*.

The carriage support frame 81 supports the carriage 91 described below. The carriage support frame 81 is a plate member arranged along the X-axis. The carriage support frame 81 is supported by the main frame 71.

The carriage driving motor 82 generates a driving force for moving the carriage 91. The carriage driving motor 82 rotates by the control of the control unit 110. The carriage driving motor 82 is supported by the carriage support frame 81. The carriage driving motor 82 illustrated in FIG. 1 is arranged at a position in the −X direction of the carriage support frame 81. The carriage driving motor 82 corresponds to an example of a driving portion.

The transmission mechanism 83 transmits the driving force generated by the carriage driving motor 82 to the carriage driving belt 85. The transmission mechanism 83 includes a transmission pulley 83*a*, a two-stage transmission pulley 83*b*, and a transmission belt 83*c*. The transmission pulley 83*a* is fixed to a drive shaft of the carriage driving motor 82. The transmission belt 83*c* is an annular belt stretching from the transmission pulley 83*a* to the two-stage transmission pulley 83*b*. The two-stage transmission pulley 83*b* includes a small pulley and a large pulley having a diameter larger than that of the small pulley. The transmission belt 83*c* is wound around the large pulley. The carriage driving belt 85 is wound around the small pulley. The transmission belt 83*c* is circularly driven by the rotation of the carriage driving motor 82. The transmission belt 83*c* rotates the large pulley. The transmission belt 83*c* rotates the small pulley by rotating the large pulley. The small pulley circularly drives the carriage driving belt 85. The rotation of the carriage driving motor 82 is transmitted to the carriage driving belt 85 at a deceleration ratio corresponding to a ratio of the diameters of the large pulley and the small pulley.

The carriage guide shaft 84 guides the carriage 91. The carriage guide shaft 84 is fixed to the carriage support frame 81. The carriage guide shaft 84 is arranged along the X-axis. The carriage guide shaft 84 guides the carriage 91 along the X-axis.

The carriage driving belt 85 moves the carriage 91. The carriage driving belt 85 is an annular belt stretching from the transmission mechanism 83 arranged at a position in the −X direction of the carriage support frame 81 to a carriage driving pulley (not illustrated) arranged at a position in the +X direction of the carriage support frame 81. The carriage driving belt 85 is arranged along the carriage guide shaft 84.

The printer 100 may include a height detecting portion 88. The height detecting portion 88 detects a height of the printing medium M placed on the table 31. The height detecting portion 88 includes a contact plate 89 arranged to protrude downward from a lower end of the main frame 71. The contact plate 89 is a plate member. The contact plate 89 is attached to the main frame 71 so as to be pivotable about an imaginary axis parallel to the X-axis. The contact plate 89 pivots when contacting the printing medium M or the medium support portion 31*m*. An arm (not illustrated) is formed at the contact plate 89. The arm is displaced according to the pivot operation of the contact plate 89. The displacement of the arm is detected by a displacement sensor (not illustrated). The displacement sensor is provided in the height detecting portion 88. For example, the displacement sensor is a magnetic sensor, a reflective optical sensor, or a transmissive optical sensor. When the displacement sensor detects a displacement of the arm, the height detecting portion 88 detects a pivot operation of the contact plate 89. The height detecting portion 88 detects the height of the printing medium M by detecting the pivot operation of the contact plate 89.

The recording portion 90 performs printing on the printing medium M. The recording portion 90 is supported by the moving portion 70. The recording portion 90 includes the carriage 91 and a printing unit 93.

The printing unit 93 is mounted to the carriage 91. The carriage 91 corresponds to an example of a mounting portion. The carriage 91 is coupled to the carriage driving belt 85. When the carriage driving belt 85 is circularly driven, the carriage 91 moves. The carriage 91 is supported by the carriage guide shaft 84. The carriage 91 is movable along the carriage guide shaft 84. The carriage 91 is movable along the X-axis, that is, the +X direction or the −X direction. The carriage 91 moves along the X-axis, between an end position in the −X direction and an end position in the +X direction. The carriage driving belt 85 moves the carriage 91 between an end position in the −X direction and an end position in the +X direction by the drive of the carriage driving motor 82.

The end position in the −X direction represents the home position HP. The home position HP is a position different from the position above the printing medium M. The home position HP is a position in the −X direction or the +X direction with respect to the recording medium M. In the case of the printer 100 illustrated in FIG. 1, the home position HP is a position in the −X direction of the printing medium M and the medium support portion 31*m* configured to support the printing medium M. The carriage 91 positioned at the home position HP may face a maintenance mechanism configured to perform maintenance such as flushing and cleaning of the printing unit 93. The maintenance mechanism is not illustrated. The maintenance mechanism is arranged at a facing position facing the carriage 91 positioned at the home position HP or at a position adjacent to the facing position. The home position HP corresponds to an example of a standby position. In FIG. 1, the recording portion 90 positioned at the home position HP is indicated by a dashed line.

The end position in the +X direction is a return position RP. The carriage 91 stops at the return position RP. The carriage 91 moves from the home position HP in a first scanning direction SD1. The carriage 91 passes above the printing medium M from the home position HP and stops at the return position RP. The return position RP is a position in the first scanning direction SD1 with respect to the home position HP. After stopping at the return position RP, the carriage 91 moves in a second scanning direction SD2 that is a reverse direction of the first scanning direction SD1. The carriage 91 passes above the printing medium M from the return position RP and moves to the side of the home position HP. The return position RP corresponds to an example of a stop position. The first scanning direction SD1 corresponds to an example of a first direction. The second scanning direction SD2 corresponds to an example of a second direction.

The printing unit 93 prints on the printing medium M. When the carriage 91 moves along the X-axis, the printing unit 93 moves in the +X direction or the −X direction. When the main frame 71 moves along the Y-axis, the printing unit 93 moves in the +Y direction or the −Y direction. The printer 100 can move the printing unit 93 along the X-axis and the Y-axis with respect to the table 31. The printing unit 93 can eject ink onto the entire printing medium M supported by the table 31.

Figure 2:
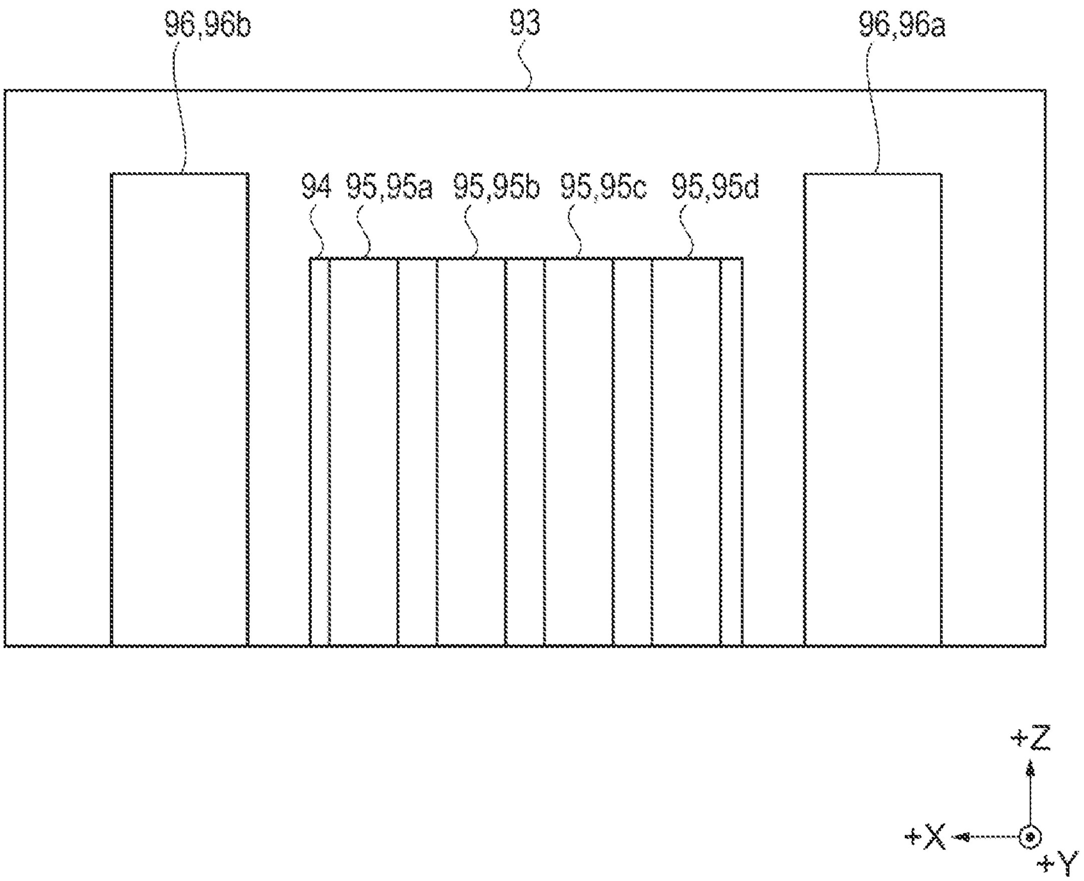
FIG. 2 is a diagram illustrating a cross-sectional configuration of a printing unit.

FIG. 2 illustrates a cross-sectional configuration of the printing unit 93. FIG. 2 illustrates an X-Z cross section. FIG. 2 illustrates an example of the printing unit 93. The printing unit 93 includes a printing head unit 94 and a UV-lamp 96. In the printing unit 93, a first UV-lamp 96*a*, the printing head unit 94, and a second UV-lamp 96*b* are arranged in the order from the first UV-lamp 96*a*, the printing head unit 94, and the second UV-lamp 96*b* in the first scanning direction SD1. The first UV-lamp 96*a*, the printing head unit 94, and the second UV-lamp 96*b* are mounted to the carriage 91 in the order from the first UV-lamp 96*a*, the printing head unit 94, and the second UV-lamp 96*b* along the first scanning direction SD1.

The printing head unit 94 includes one or more printing heads 95. The printing head unit 94 illustrated in FIG. 2 includes a first printing head 95*a*, a second printing head 95*b*, a third printing head 95*c*, and a fourth printing head 95*d*. The printing head unit 94 illustrated in FIG. 2 includes four of the printing heads 95, but the printing head unit 94 is not limited thereto. It is only required that the printing head unit 94 includes one or more of the printing heads 95. The printing head unit 94 may include a plurality of the printing heads 95. The printing head unit 94 corresponds to an example of a printing head.

The printing head 95 ejects ink onto the printing medium M. The printing head 95 includes a plurality of nozzles (not illustrated) configured to eject ink. The nozzles open at a lower end surface of the printing head 95. When the printing head 95 ejects ink from the nozzles, the ejected ink flies from the lower end surface of the printing head 95 to the printing medium M placed on the table 31. The ink lands on the printing medium M.

The ink ejected by the printing head 95 is ultraviolet-curable ink. The ultraviolet-curable ink corresponds to an example of photocurable ink. The ultraviolet-curable ink contains a resin material, a photopolymerization initiator, and a solution as main materials.

The resin material is a material that forms a resin film. The resin material is liquid at room temperature. The resin material has a cross-linkable group. The resin material may be a material that forms a polymer by polymerization. The resin material may have an oligomeric form. The resin material may have a monomeric form.

The photopolymerization initiator functions as a curing agent. The photopolymerization initiator acts on the cross-linkable group of the resin material to promote a cross-linking reaction. For example, benzyl dimethyl ketal is used as the photopolymerization initiator.

The solution is a solvent or a dispersion medium. The solution adjusts the viscosity of the resin material. By adding the solution to the ultraviolet-curable ink, the ultraviolet-curable ink is adjusted to a viscosity determined in advance.

The ultraviolet-curable ink may contain a colorant and a functional material. When the ultraviolet-curable ink contains the colorant and the functional material, the ultraviolet-curable ink is imparted with a unique function. The colorant is a pigment, a dye, or the like. For example, the ultraviolet-curable ink contains cyan, magenta, yellow, and white pigments as colorants. As an example, the functional material is a surface-modifying material such as a lyophilic or a lyophobic material.

Each of the plurality of printing heads 95 ejects ultraviolet-curable ink onto the printing medium M. The printing head unit 94 may eject, by the plurality of printing heads 95, a plurality of types of ultraviolet-curable ink including a number of types equal or greater than the number of printing heads 95, onto the printing medium M. The plurality of types of ink are different from each other in at least one of the resin material, the photopolymerization initiator, or the solution. The plurality of types of ink may be different from each other in the added colorant and the functional material.

The plurality of types of ultraviolet-curable ink ejected by the printing head unit 94 may include clear ink. The clear ink contains a photopolymerization initiator and a polymerizable compound. The clear ink is used to protect a coating film formed by another ink, adjust the shiny appearance of a printed object, or the like. The content of the colorant contained in the clear ink may be 0.2 mass % or less with respect to the total amount of the clear ink. The clear ink may contain no color material.

As an example, each of the first printing head 95*a*, the second printing head 95*b*, the third printing head 95*c*, and the fourth printing head 95*d* ejects types of ultraviolet-curable ink different from each other. The first printing head 95*a* ejects cyan ink containing a cyan pigment. The second printing head 95*b* ejects magenta ink containing a magenta pigment. The third printing head 95*c* ejects clear ink. The fourth printing head 95*d* ejects yellow ink containing a yellow pigment.

The printing head unit 94 ejects a plurality of types of ultraviolet-curable ink onto the printing medium M. The plurality of types of ultraviolet-curable ink include clear ink.

The clear ink can be used in the printer 100 to improve the glossiness of a printed image.

The UV-lamp 96 photo-cures the ultraviolet-curable ink ejected onto the printing medium M. UV is an abbreviation for ultraviolet. The UV-lamp 96 irradiates the printing medium M with ultraviolet light. The UV-lamp 96 irradiates the printing medium M with ultraviolet light to cure the ultraviolet-curable ink ejected onto the printing medium M. The ultraviolet irradiation corresponds to an example of light irradiation.

The UV-lamp 96 is constituted by a metal halide lamp, a xenon lamp, a carbon arc lamp, a chemical lamp, a low-pressure mercury lamp, a high-pressure mercury lamp, and the like. The UV-lamp 96 may be constituted by an ultraviolet light emitting diode, an ultraviolet light emitting semiconductor laser, and the like. The UV-lamp 96 emits ultraviolet light having wavelengths from 365 nm to 410 nm. An irradiation peak intensity of the UV-lamp 96 may be 200 $mW/cm^2$ or greater, and may be 800 $mW/cm^2$ or greater.

The printing unit 93 illustrated in FIG. 2 includes the first UV-lamp 96*a* and the second UV-lamp 96*b* as the UV-lamp 96. The first UV-lamp 96*a* corresponds to an example of an irradiation portion. The printing unit 93 includes the second UV-lamp 96*b*, but the printing unit 93 is not limited thereto. The printing unit 93 may not include the second UV-lamp 96*b*. The printing unit 93 may include the second UV-lamp 96*b*.

When the carriage 91 moves in the first scanning direction SD1, the first UV-lamp 96*a* emits ultraviolet light. When the carriage 91 moves in the first scanning direction SD1, the printing head unit 94 ejects ink onto the printing medium M. The first UV-lamp 96*a* irradiates with ultraviolet light the ink ejected onto the printing medium M by the printing head unit 94.

When the carriage 91 moves in the second scanning direction SD2, the second UV-lamp 96*b* emits ultraviolet light. When the carriage 91 moves in the second scanning direction SD2, the printing head unit 94 may eject ink onto the printing medium M. The second UV-lamp 96*b* irradiates with ultraviolet light the ink ejected onto the printing medium M by the printing head unit 94 moving in the second scanning direction SD2. The printer 100 includes the second UV-lamp 96*b* in a case where printing is performed when the carriage 91 moves in the second scanning direction SD2.

Figure 3:
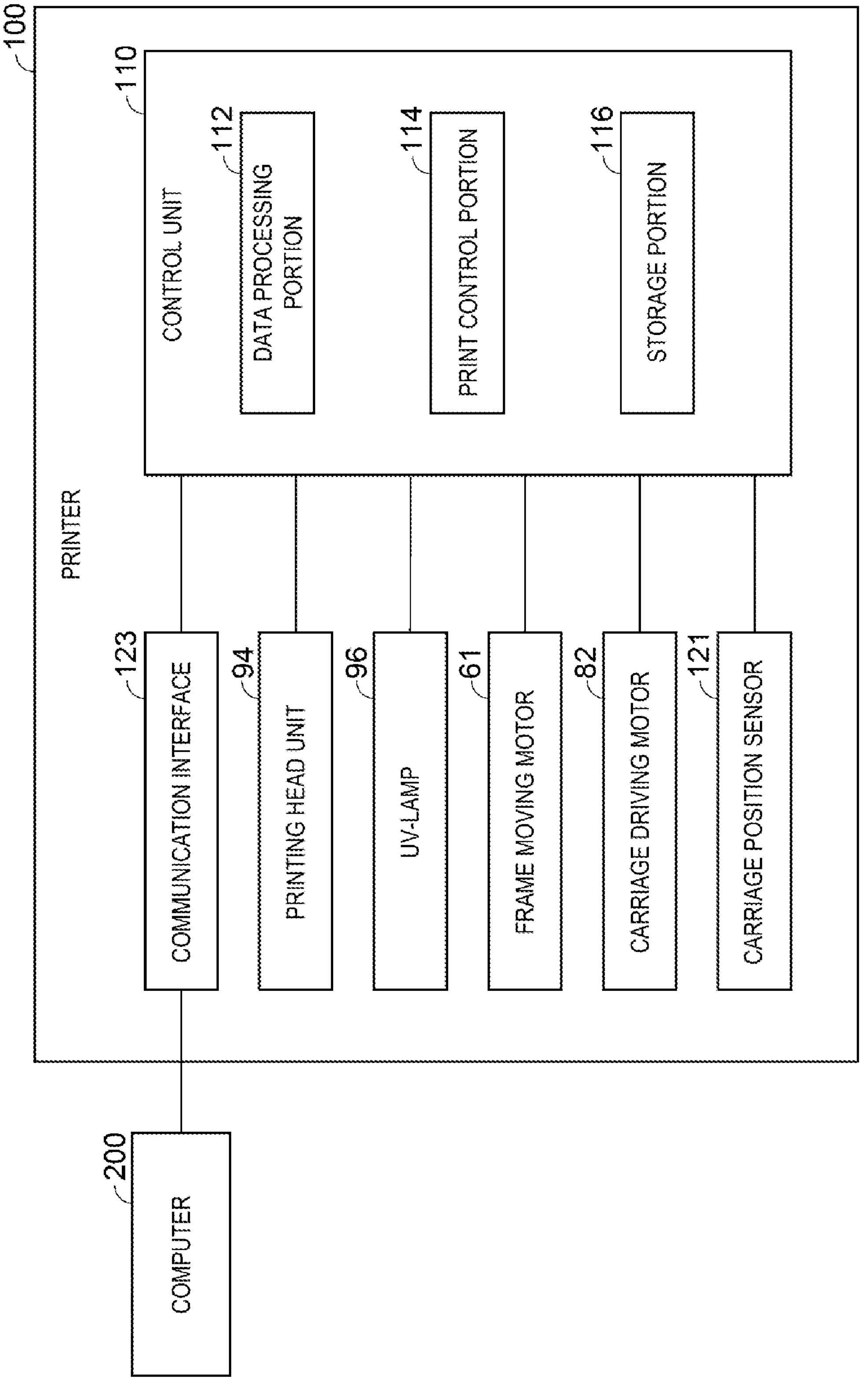
FIG. 3 is a diagram illustrating a block configuration of the printer.

FIG. 3 illustrates a block configuration of the printer 100. The printer 100 is communicably connected to a computer 200. The printer 100 is coupled to the computer 200 via a universal serial bus (USB) cable or the like. The printer 100 may be communicably connected to the computer 200 via a network in a wireless or wired manner. The computer 200 generates print data. The computer 200 transmits the generated print data to the printer 100. The computer 200 may receive various types of settings related to printing by the printer 100. The computer 200 transmits the received various types of settings to the printer 100.

As illustrated in FIG. 3, the printer 100 includes the control unit 110, the printing head unit 94, the UV-lamp 96, the frame moving motor 61, the carriage driving motor 82, a carriage position sensor 121, and a communication interface 123.

The control unit 110 is a controller configured to control each portion of the printer 100. The control unit 110 includes a control processor such as a central processing unit (CPU), a random-access memory (RAM), and a read only memory (ROM). The control unit 110 operates as a functional portion by executing a program by the control processor. The RAM and the ROM function as a work area. The control unit 110 corresponds to an example of a control portion. The control unit 110 controls various types of motors and the like, based on a detection result detected by various types of sensors.

The control unit 110 includes a storage portion 116. The storage portion 116 stores various types of programs such as a control program operated by the control unit 110 and various types of data. The storage portion 116 stores various types of data such as print data. The RAM and the ROM may operate as the storage portion 116. The storage portion 116 may include a magnetic storage device such as a hard disk drive (HDD), and a semiconductor memory.

The control unit 110 functions as a data processing portion 112 and a print control portion 114 by executing a control program. The data processing portion 112 and the print control portion 114 are functional portions. The control unit 110 functions as the data processing portion 112 and the print control portion 114 to control the printing head unit 94, the UV-lamp 96, the frame moving motor 61, the carriage driving motor 82, the carriage position sensor 121, and the communication interface 123. The control unit 110 may control the raising and lowering motor 33, the displacement sensor, and the like.

The data processing portion 112 processes print data. The data processing portion 112 processes print data acquired from the computer 200 or the like. The data processing portion 112 converts the print data into print control data that can be processed by the printer 100. The print control data includes a command for controlling each portion. The print control data includes printing head control data for causing each printing head 95 to eject ink. When the print data is data for printing an image having a glossy tone, the print control data includes data related to the ejection of clear ink. The data processing portion 112 transmits the generated print control data to the print control portion 114.

The print control portion 114 controls each portion of the printer 100. The print control portion 114 controls each portion to execute printing on the printing medium M. The print control portion 114 controls the printing head unit 94, the UV-lamp 96, the frame moving motor 61, and the carriage driving motor 82. The print control portion 114 receives a detection result from the carriage position sensor 121. The print control portion 114 controls each portion, based on the received detection result. The print control portion 114 corresponds to an example of a control portion.

The printing head unit 94 ejects ink by the control of the print control portion 114. The printing head unit 94 receives printing head control data from the print control portion 114. Each printing head 95 included in the printing head unit 94 ejects ink, based on the printing head control data. When the printing head control data includes data relating to the ejection of clear ink, the printing head 95 configured to eject clear ink ejects the clear ink onto the printing medium M, based on the printing head control data.

The UV-lamp 96 emits ultraviolet light by the control of the print control portion 114. The print control portion 114 controls the UV-lamp 96 to control the timing of ultraviolet irradiation, the light amount of ultraviolet irradiation, and the like. The print control portion 114 controls the timing of ultraviolet irradiation, the light amount of ultraviolet irradiation, and the like, based on the print control data and the detection result by the carriage position sensor 121. The print control portion 114 individually controls the first UV-lamp 96*a* and the second UV-lamp 96*b*.

The frame moving motor 61 rotates by the control of the print control portion 114. A start timing, a stop timing, a rotation direction, and a rotation amount of the rotation of the frame moving motor 61 are controlled by the control of the print control portion 114. The print control portion 114 controls the rotation of the frame moving motor 61 to control the movement of the moving portion 70. The moving portion 70 moves along the Y-axis, based on the control by the print control portion 114. A moving direction along the Y-axis, a position along the Y-axis, and a moving velocity of the moving portion 70 are controlled. The print control portion 114 may control the position of the moving portion 70, based on a detection result of a frame position sensor (not illustrated).

The carriage driving motor 82 rotates and operates by the control of the print control portion 114. A start timing, a stop timing, a rotation direction, and a rotation amount of the rotation operation by the carriage driving motor 82 are controlled by the control of the print control portion 114. The rotation operation of the carriage driving motor 82 is controlled by the print control portion 114, and thus, the movement of the carriage 91 is controlled. The carriage 91 moves along the X-axis, based on the control by the print control portion 114. A moving direction along the X-axis, a position along the X-axis, and a moving velocity of the carriage 91 are controlled.

The carriage position sensor 121 detects the position of the carriage 91. For example, the carriage position sensor 121 is an encoder provided in the drive shaft of the carriage driving motor 82. The encoder detects a rotational position of the drive shaft to detect the position of the carriage 91 along the X-axis. The carriage position sensor 121 may be a line sensor. For example, the line sensor is provided in the main frame 71 or the carriage support frame 81. The line sensor detects the position of the carriage 91 along the X-axis. The carriage position sensor 121 transmits the detected detection result to the print control portion 114. The print control portion 114 controls the position of the carriage 91, based on the detection result by the carriage position sensor 121.

The communication interface 123 is communicably connected to an external device such as the computer 200. The communication interface 123 is connected to an external device in a wired or wireless manner, according to a predetermined communication protocol. The communication interface 123 receives print data, print setting conditions, a program, and the like from the external device. The communication interface 123 transmits a printing result, maintenance data, and the like of the printer 100 to the external device. The communication interface 123 receives print data transmitted from the computer 200. The communication interface 123 transmits the received print data to the control unit 110. The data processing portion 112 of the control unit 110 receives the print data transmitted from the communication interface 123. The data processing portion 112 processes the received print data.

First Embodiment

The printer 100 according to the first embodiment includes the printing unit 93 provided with the printing head unit 94 and the first UV-lamp 96*a*. The printing unit 93 is mounted to the carriage 91. The first UV-lamp 96*a* and the printing head unit 94 are mounted to the carriage 91 in the order from the first UV-lamp 96*a* to the printing head unit 94 along the first scanning direction SD1. The printer 100 according to the first embodiment does not include the second UV-lamp 96*b*. The printer 100 performs printing when the carriage 91 moves in the first scanning direction SD1. The printer 100 does not perform printing when the carriage 91 moves in the second scanning direction SD2.

FIGS. 4, 5, 6, 7, and 8 illustrate a state of the printer 100 in the first embodiment. In FIGS. 4, 5, 6, 7, and 8, configurations other than the recording portion 90 and the table 31 are omitted. FIGS. 4, 5, 6, 7, and 8 illustrate the carriage 91 and the printing unit 93 as the recording portion 90. The printing unit 93 includes the printing head unit 94 and the first UV-lamp 96*a*. FIGS. 4, 5, 6, 7, and 8 illustrate the medium support portion 31*m* and the table leg portion 31*n* as the table 31. The medium support portion 31*m* supports the printing medium M. FIGS. 4, 5, 6, 7, and 8 illustrate the maximum size of the printing medium M that can be supported by the medium support portion 31*m*.

Figure 4:
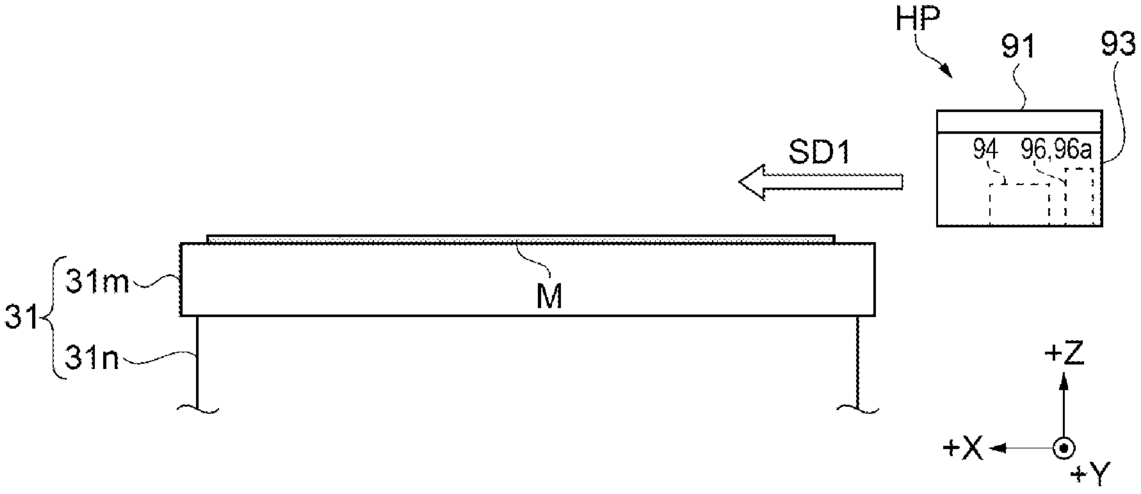
FIG. 4 is a diagram illustrating a state where a carriage is positioned at a home position.

FIG. 4 illustrates a state where the carriage 91 is positioned at the home position HP. FIG. 4 is a diagram of a case where the printer 100 is viewed from the +Y direction. FIG. 4 illustrates a state when the printer 100 is stopped.

When the printer 100 is stopped, the carriage 91 is positioned at the home position HP. When the carriage 91 is positioned at the home position HP, the printing head unit 94 is positioned at a predetermined position. The home position HP is a position where the printing head unit 94 and the printing head 95 included in the printing head unit 94 stand by. The printing head unit 94 may face the maintenance mechanism when the printing head unit 94 is positioned at the predetermined position. When the printing head unit 94 is positioned at the predetermined position, the nozzles of the printing head 95 may be capped by a capping member (not illustrated).

The printer 100 starts printing when receiving a print instruction. The print instruction is included in the print data received from the computer 200. The print instruction may be received when a control panel (not illustrated) receives an operation input from a user. When receiving the print instruction, the printer 100 moves the carriage 91 from the home position HP in the first scanning direction SD1. The print control portion 114 of the control unit 110 controls the carriage driving motor 82 to move the carriage 91 in the first scanning direction SD1.

Figure 5:
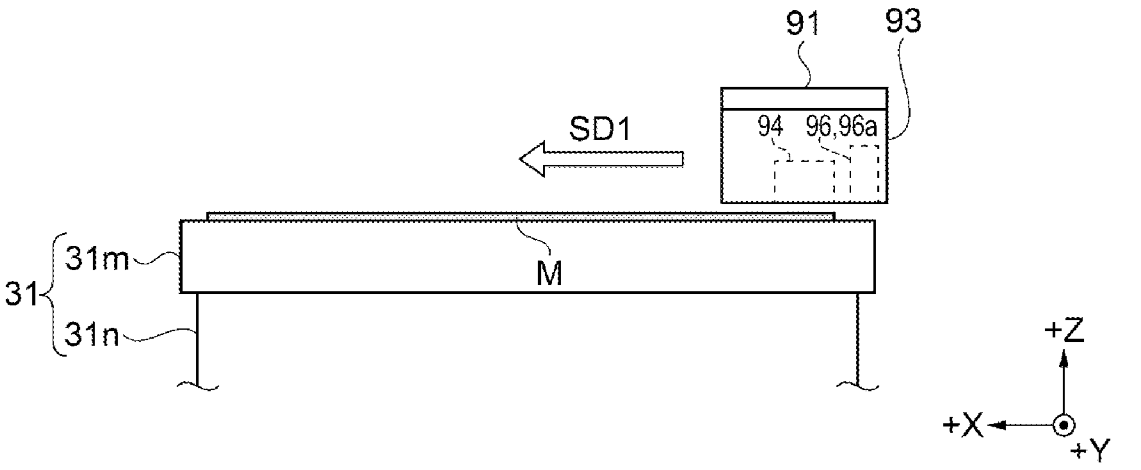
FIG. 5 is a diagram illustrating a state where a printing head unit is positioned above a printing medium.

FIG. 5 illustrates a state where the printing head unit 94 is positioned above the printing medium M. FIG. 5 illustrates a state where the first UV-lamp 96*a* is not positioned above the printing medium M. FIG. 5 is a diagram of a case where the printer 100 is viewed from the +Y direction.

The carriage 91 moves from the home position HP in the first scanning direction SD1. The print control portion 114 of the control unit 110 controls the carriage driving motor 82 to move the carriage 91 in the first scanning direction SD1. When the printing head unit 94 moves above the printing medium M, the printing head 95 included in the printing head unit 94 ejects ink onto the printing medium M. The printing head 95 ejects ink onto the printing medium M, based on the printing head control data. The first UV-lamp 96*a* starts emitting ultraviolet light before moving above the printing medium M. The first UV-lamp 96*a* may start emitting ultraviolet light when the carriage 91 starts moving from the home position HP in the first scanning direction SD1. The print control portion 114 of the control unit 110 controls the first UV-lamp 96*a* to control the ultraviolet irradiation by the first UV-lamp 96*a*. The carriage position sensor 121 detects the position of the carriage 91 when the carriage 91 is moving.

Figure 6:
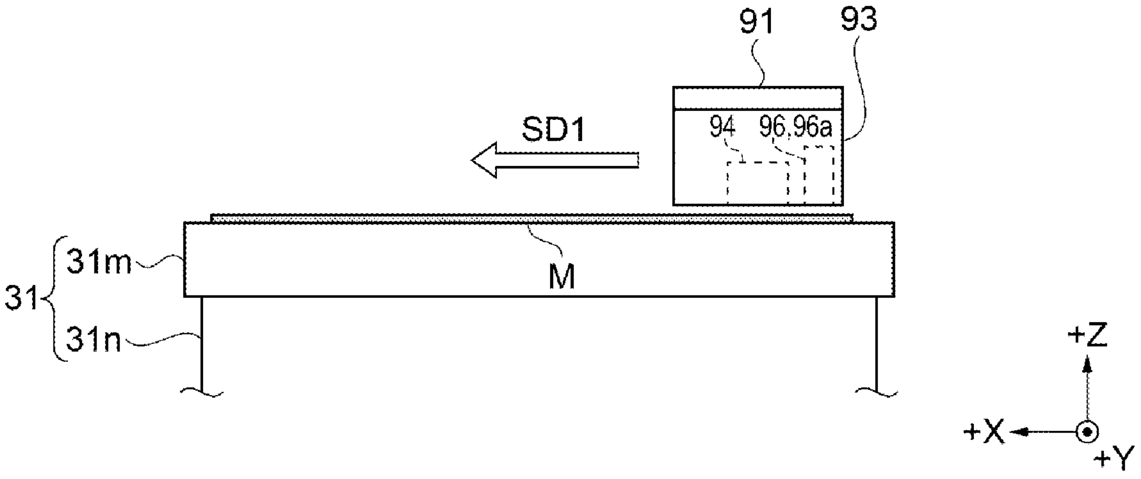
FIG. 6 is a diagram illustrating a state where a first UV-lamp is positioned above the printing medium.

FIG. 6 illustrates a state where the first UV-lamp 96*a* is positioned above the printing medium M. FIG. 6 illustrates a state where the printing head unit 94 and the first UV-lamp 96*a* are positioned above the printing medium M.

When the carriage 91 moves in the first scanning direction SD1, the first UV-lamp 96*a* moves above the printing medium M. The first UV-lamp 96*a* irradiates the printing medium M with ultraviolet light. The first UV-lamp 96*a* irradiates the ink ejected onto the printing medium M with ultraviolet light. The ink irradiated with ultraviolet light is cured by ultraviolet curing. The ink is fixed onto the printing medium M by the ultraviolet curing. When the carriage 91 moves above the printing medium M, the printing head 95 ejects ink and the first UV-lamp 96*a* emits ultraviolet light. The print control portion 114 of the control unit 110 controls the carriage driving motor 82 to control the movement of the carriage 91 in the first scanning direction SD1. The print control portion 114 of the control unit 110 controls the first UV-lamp 96*a* to control the ultraviolet irradiation by the first UV-lamp 96*a*. The printer 100 performs printing on the printing medium M by the operation of the printing unit 93.

Figure 7:
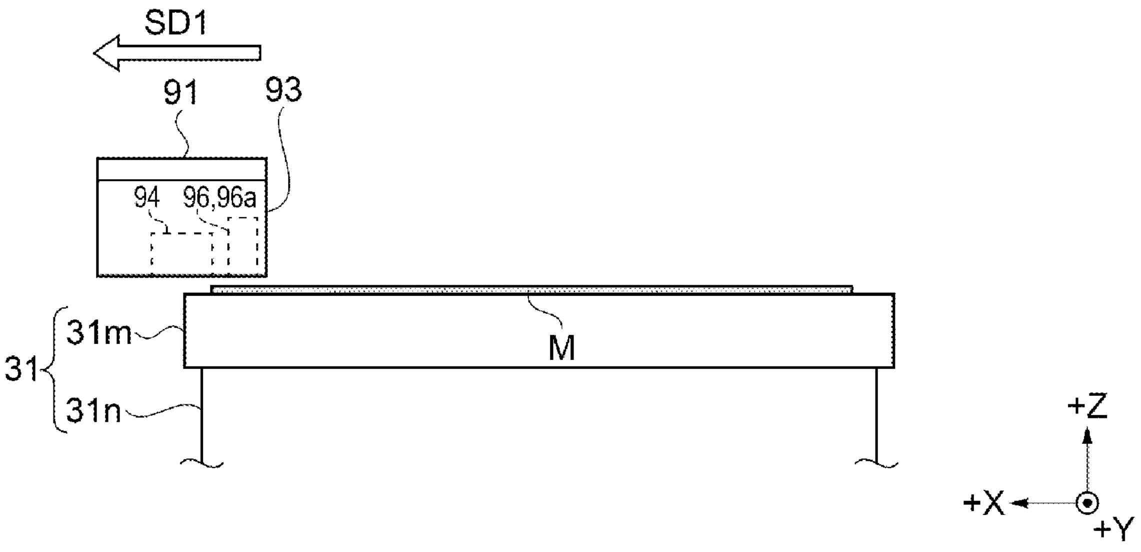
FIG. 7 is a diagram illustrating a state where the printing head unit is moved to a position separated from a position above the printing medium.

FIG. 7 illustrates a state where the printing head unit 94 is moved to a position separated from the position above the printing medium M. FIG. 7 illustrates a state where the first UV-lamp 96*a* is positioned above the printing medium M. The carriage 91 is moving in the first scanning direction SD1.

When the carriage 91 moves to a position separated from the position above the printing medium M, the printing head 95 included in the printing head unit 94 stops ejecting ink. The first UV-lamp 96*a* is positioned above the printing medium M. The position of the carriage 91 illustrated in FIG. 7 is a position where the ultraviolet light emitted by the first UV-lamp 96*a* does not reach an end portion of the printing medium M. The end portion of the printing medium M is an end portion of the printing medium M in the +X direction. The first UV-lamp 96*a* continues to emit ultraviolet light. The carriage 91 continues to move in the first scanning direction SD1. The carriage position sensor 121 detects the position of the carriage 91.

Figure 8:
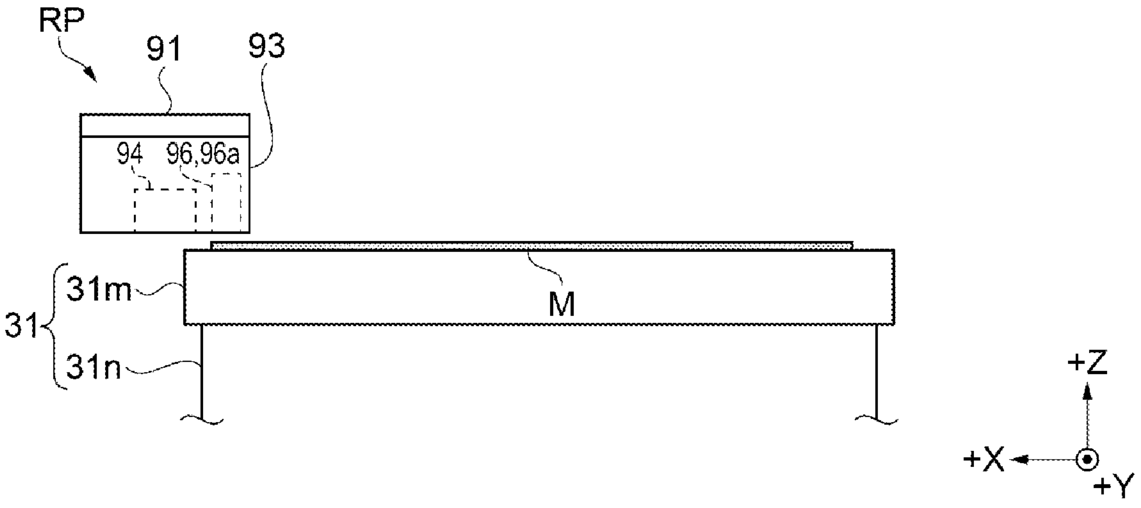
FIG. 8 is a diagram illustrating a state where the carriage is positioned at a return position.

FIG. 8 illustrates a state where the carriage 91 is positioned at the return position RP. The return position RP is a position in the first scanning direction SD1 with respect to the home position HP. The return position RP is a position where the carriage 91 stops. The print control portion 114 of the control unit 110 controls the carriage driving motor 82 to control a stop operation of the carriage 91. The carriage 91 temporarily stops at the return position RP and then moves in the second scanning direction SD2.

When the carriage 91 is positioned at the return position RP, the first UV-lamp 96*a* faces the printing medium M. The return position RP is a position where the first UV-lamp 96*a* faces the printing medium M. The first UV-lamp 96*a* stops at a position where the end portion of the printing medium M can be irradiated with ultraviolet light emitted by the first UV-lamp 96*a*. The first UV-lamp 96*a* can irradiate the end portion of the printing medium M with ultraviolet light. At the return position RP, the printing head unit 94 is positioned at a position separated from the position facing the printing medium M. When the printing head unit 94 moves to the position separated from the position facing the printing medium M, the printing head unit 94 can perform printing on the end portion of the printing medium M.

When a position where the first UV-lamp 96*a* faces the printing medium M is selected as the return position RP in the printer 100, it is possible to shorten a moving distance of the carriage 91 along the X-axis. By shortening the moving distance of the carriage 91 along the X-axis, it is possible to reduce a width of the printer 100 along the X-axis. Thus, a size of the printer 100 can be reduced.

The printer 100 includes the printing head unit 94 configured to eject ultraviolet-curable ink onto the printing medium M, the first UV-lamp 96*a* configured to irradiate the printing medium M with ultraviolet light, the carriage 91 on which the first UV-lamp 96*a* and the printing head unit 94 are mounted in the order from the first UV-lamp 96*a* to the printing head unit 94 along the first scanning direction SD1, and the carriage driving motor 82 configured to move the carriage 91 between the home position HP where the printing head unit 94 is in a standby state and the return position RP that is a position in the first scanning direction SD1 with respect to the home position HP. The return position RP is a position where the first UV-lamp 96*a* faces the printing medium M.

When the return position RP is a position where the first UV-lamp 96*a* faces the printing medium M, a moving distance of the carriage 91 along the X-axis is shortened. When the moving distance of the carriage 91 can be shortened, it is possible to reduce the width of the printer 100 along the X-axis. Thus, a size of the printer 100 can be reduced.

The printer 100 includes the carriage driving motor 82 and the control unit 110 configured to control the first UV-lamp 96*a*.

The control unit 110 can control the movement of the carriage 91 by controlling the carriage driving motor 82. The control unit 110 can control the irradiation of the printing medium M with ultraviolet light by controlling the first UV-lamp 96*a*.

The carriage 91 decelerates and then stops at the return position RP. The print control portion 114 of the control unit 110 controls the carriage driving motor 82 to decelerate the carriage 91. After the carriage 91 decelerates, the print control portion 114 may stop the ultraviolet irradiation by the first UV-lamp 96*a*. The print control portion 114 causes the first UV-lamp 96*a* to stop emitting ultraviolet light, before the carriage 91 stops at the return position RP. When the carriage 91 decelerates, the amount of ultraviolet light irradiating the end portion of the printing medium M at or near the return position RP increases. The end portion of the printing medium M at or near the return position RP is excessively irradiated with ultraviolet light. When a portion is excessively irradiated with ultraviolet light, the image quality of the portion excessively irradiated with the ultraviolet light deteriorates more than that of another portion. In particular, when clear ink is included in the plurality of types of ink ejected onto the printing medium M, the image quality easily deteriorates.

The control unit 110 causes the first UV-lamp 96*a* to stop emitting ultraviolet light, before the carriage 91 stops at the return position RP.

The printer 100 can suppress excessive ultraviolet irradiation of the printing medium M at or near the return position RP by stopping the ultraviolet irradiation before the carriage 91 stops. Thus, the image quality of an image at or near the return position RP is less likely to deteriorate.

When the carriage 91 stops at the return position RP, the print control portion 114 may stop the ultraviolet irradiation by the first UV-lamp 96*a*. When the carriage 91 stops at the return position RP, the first UV-lamp 96*a* stops at a position facing the printing medium M. When the first UV-lamp 96*a* continues to emit ultraviolet light, a position facing the first UV-lamp 96*a* is excessively irradiated with ultraviolet light. The image quality of a portion excessively irradiated with the ultraviolet light deteriorates more than that of another portion. In particular, when a plurality of types of printing heads 95 are used to eject a plurality of types of ink, the image quality easily deteriorates.

The carriage 91 decelerates and then stops at the return position RP. The print control portion 114 of the control unit 110 controls the carriage driving motor 82 to decelerate the carriage 91. After the carriage 91 decelerates, the print control portion 114 may reduce the light amount of ultraviolet light emitted by the first UV-lamp 96*a*. The print control portion 114 reduces the light amount of ultraviolet light emitted by the first UV-lamp 96*a*, before the carriage 91 stops at the return position RP. When the carriage 91 decelerates, the amount of ultraviolet irradiation of the printing medium M at or near the return position RP increases. The printing medium M at or near the return position RP is excessively irradiated with ultraviolet light. When a portion is excessively irradiated with ultraviolet light, the image quality of the portion excessively irradiated with the ultraviolet light deteriorates more than that of another portion. In particular, when clear ink is included in the plurality of types of ink ejected onto the printing medium M, the image quality easily deteriorates.

The control unit 110 reduces the light amount of ultraviolet light emitted by the first UV-lamp 96*a*, before the carriage 91 stops at the return position RP.

The printer 100 can suppress excessive ultraviolet irradiation of the printing medium M at or near the return position RP by decreasing the light amount emitted by ultraviolet irradiation before the carriage 91 stops. Thus, the image quality at or near the return position RP is less likely to deteriorate.

FIGS. 4, 5, 6, 7, and 8 illustrate configurations in which the width of the printing medium M along the X-axis is narrower than the width of the medium support portion 31*m* along the X-axis, but the present configuration is not limited thereto. The width of the maximum size of the printing medium M along the X-axis may be the same as the width of the medium support portion 31*m* along the X-axis. The width of the printing medium M along the X-axis, or the width of the medium support portion 31*m* corresponds to a printing region.

Figure 9:
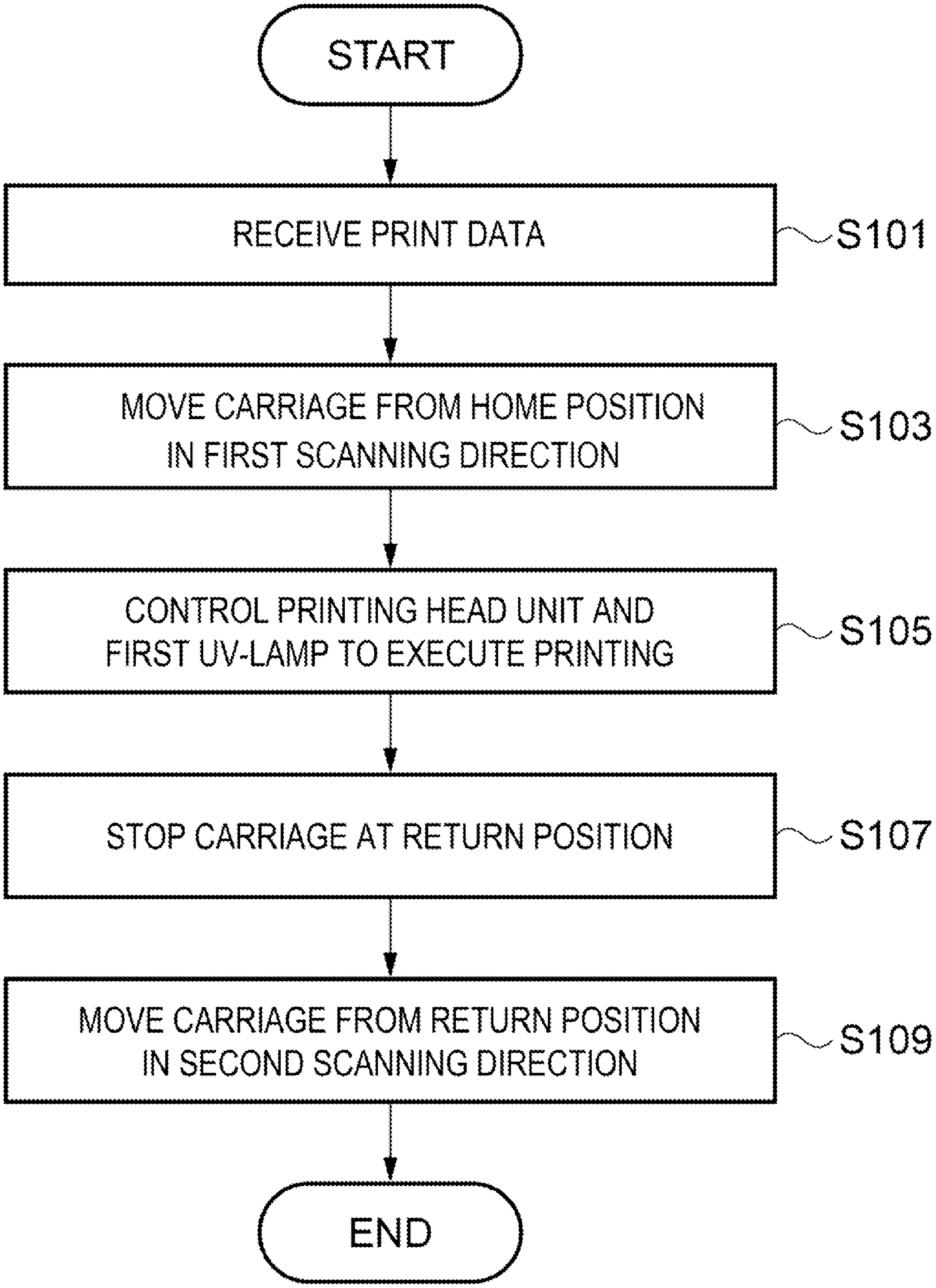
FIG. 9 is a diagram illustrating a flowchart of a printing operation by the printer.

FIG. 9 illustrates a flowchart of a printing operation by the printer 100. FIG. 9 illustrates a control method of the printer 100. FIG. 9 illustrates a control method of the printer 100 according to the first embodiment.

In step S101, the printer 100 receives print data. The communication interface 123 receives print data transmitted from the computer 200. The communication interface 123 transmits the received print data to the data processing portion 112. The data processing portion 112 processes the received print data to generate print control data that can be processed by the printer 100. The data processing portion 112 transmits the generated print control data to the print control portion 114. The print control portion 114 receives the print control data.

In step S103, after receiving the print data, the printer 100 moves the carriage 91 from the home position HP in the first scanning direction SD1. The print control portion 114 rotationally drives the carriage driving motor 82, based on the print control data. The carriage 91 stands by in advance at the home position HP. The print control portion 114 rotationally drives the carriage driving motor 82 to move the carriage 91 from the home position HP in the first scanning direction SD1.

The printer 100 moves the carriage 91 from the home position HP in the first scanning direction SD1, and then, the printer 100 executes printing in step S105. When the printing head unit 94 mounted to the carriage 91 moves to a position facing the printing medium M, the printing head 95 included in the printing head unit 94 ejects ink. The ink to be ejected is an ultraviolet-curable ink. The printing head 95 ejects ink, based on the print control data. The printer 100 causes the printing head 95 to eject ink to execute printing. The print control portion 114 controls the printing head unit 94 and the carriage driving motor 82 to cause the printing head 95 to execute printing. The print control portion 114 causes the first UV-lamp 96*a* to emit ultraviolet light, before the first UV-lamp 96*a* faces the printing medium M. When the first UV-lamp 96*a* moves to a position facing the printing medium M, the first UV-lamp 96*a* irradiates the printing medium M with ultraviolet light. The print control portion 114 controls a start timing of the ultraviolet irradiation by the first UV-lamp 96*a* and the light amount of the ultraviolet irradiation.

After executing the printing, the printer 100 stops the carriage 91 at the return position RP in step S107. The print control portion 114 decelerates the carriage 91, before the carriage 91 reaches the return position RP. The print control portion 114 controls the carriage driving motor 82 to decelerate the carriage 91. When the printing head unit 94 moves to a position separated from the position facing the printing medium M, the print control portion 114 stops the ejection of ink. The print control portion 114 controls the carriage driving motor 82 to stop the carriage 91 at the return position RP. The return position RP is a position where the first UV-lamp 96*a* faces the printing medium M.

After the carriage 91 stops at the return position RP, the printer 100 moves the carriage 91 from the return position RP in the second scanning direction SD2 in step S109. The print control portion 114 controls the carriage driving motor 82 to move the carriage 91 in the second scanning direction SD2. The print control portion 114 moves the carriage 91 above the printing medium M in the second scanning direction SD2. While the carriage 91 moves above the printing medium M, the print control portion 114 does not cause the printing head 95 to eject ink. The printer 100 does not execute printing while the carriage 91 moves in the second scanning direction SD2.

The printer 100 includes the carriage 91 on which the first UV-lamp 96*a* and the printing head unit 94 are mounted in the order from the first UV-lamp 96*a* to the printing head unit 94 along the first scanning direction SD1. The printer 100 ejects ultraviolet-curable ink onto the printing medium M. In a method of controlling the printer 100, the carriage 91 is moved from the home position HP into the first scanning direction SD1, passes above the printing medium M, and the carriage 91 is stopped at the return position RP where the first UV-lamp 96*a* mounted to the carriage 91 faces the printing medium M.

When the return position RP is a position where the first UV-lamp 96*a* faces the printing medium M, a moving distance of the carriage 91 along the X-axis is shortened.

When the moving distance of the carriage 91 can be shortened, it is possible to reduce the width of the printer 100 along the X-axis. Thus, a size of the printer 100 can be reduced.

Second Embodiment

The printer 100 according to the second embodiment includes the printing unit 93 provided with the printing head unit 94, the first UV-lamp 96*a*, and the second UV-lamp 96*b*. The second UV-lamp 96*b* corresponds to an example of a second irradiation portion. The printing unit 93 is mounted to the carriage 91. The first UV-lamp 96*a*, the printing head unit 94, and the second UV-lamp 96*b* are mounted to the carriage 91 in the order from the first UV-lamp 96*a*, the printing head unit 94, and the second UV-lamp 96*b* along the first scanning direction SD1. The printer 100 performs printing when moving in the first scanning direction SD1 and the second scanning direction SD2.

FIGS. 10, 11, 12, and 13 illustrate a state of the printer 100 in the second embodiment. In FIGS. 10, 11, 12, and 13, configurations other than the recording portion 90 and the table 31 are omitted. FIGS. 10, 11, 12, and 13 illustrate the carriage 91 and the printing unit 93 as the recording portion 90. The printing unit 93 includes the printing head unit 94, the first UV-lamp 96*a*, and the second UV-lamp 96*b*. FIGS. 10, 11, 12, and 13 illustrate the medium support portion 31*m* and the table leg portion 31*n* as the table 31. The medium support portion 31*m* supports the printing medium M. FIGS. 10, 11, 12, and 13 illustrate the maximum size of the printing medium M that can be supported by the medium support portion 31*m*.

Figure 10:
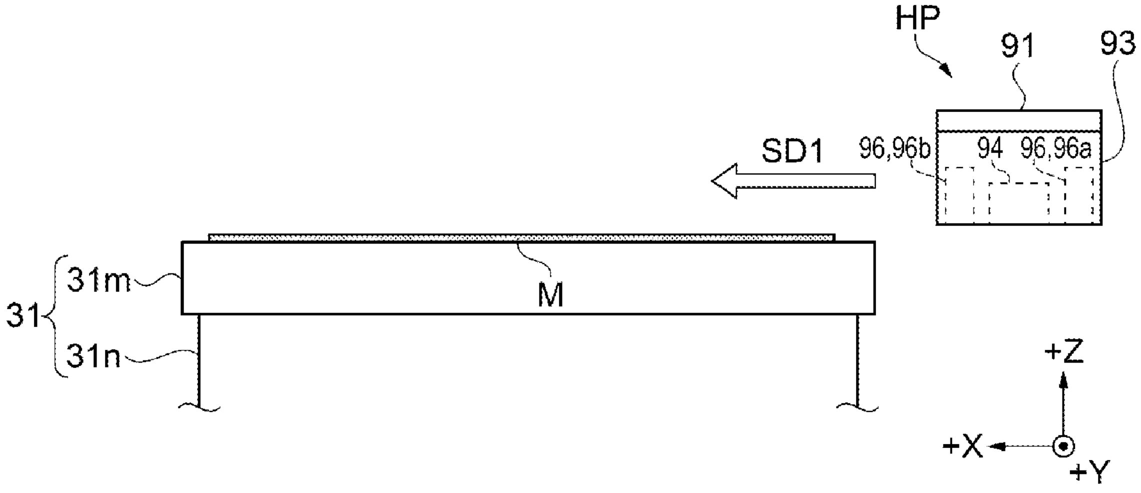
FIG. 10 is a diagram illustrating a state where the carriage is positioned at the home position.

FIG. 10 illustrates a state where the carriage 91 is positioned at the home position HP. FIG. 10 is a diagram of a case where the printer 100 is viewed from the +Y direction. FIG. 10 illustrates a state when the printer 100 is stopped.

When the printer 100 is stopped, the carriage 91 is positioned at the home position HP. When the carriage 91 is positioned at the home position HP, the printing head unit 94 is positioned at a predetermined position. The home position HP is a position where the printing head unit 94 and the printing head 95 included in the printing head unit 94 stand by. The printing head unit 94 may face the maintenance mechanism when the printing head unit 94 is positioned at the predetermined position. When the printing head unit 94 is positioned at the predetermined position, the nozzles of the printing head 95 may be capped by a capping member (not illustrated).

When receiving a print instruction, the carriage 91 moves from the home position HP in the first scanning direction SD1. When the printing head unit 94 moves to a position facing the printing medium M, the printing head 95 of the printing head unit 94 ejects ink. The printer 100 causes the printing head 95 to eject ink to perform printing on the printing medium M. The printing head 95 performs printing on the printing medium M, until the carriage 91 moves to a first return position RP1. The first UV-lamp 96*a* emits ultraviolet light, before moving to a position facing the printing medium M. When the first UV-lamp 96*a* moves to the position facing the printing medium M, the first UV-lamp 96*a* irradiates the printing medium M with ultraviolet light. The first UV-lamp 96*a* emits ultraviolet light, until the carriage 91 moves to the first return position RP1.

Figure 11:
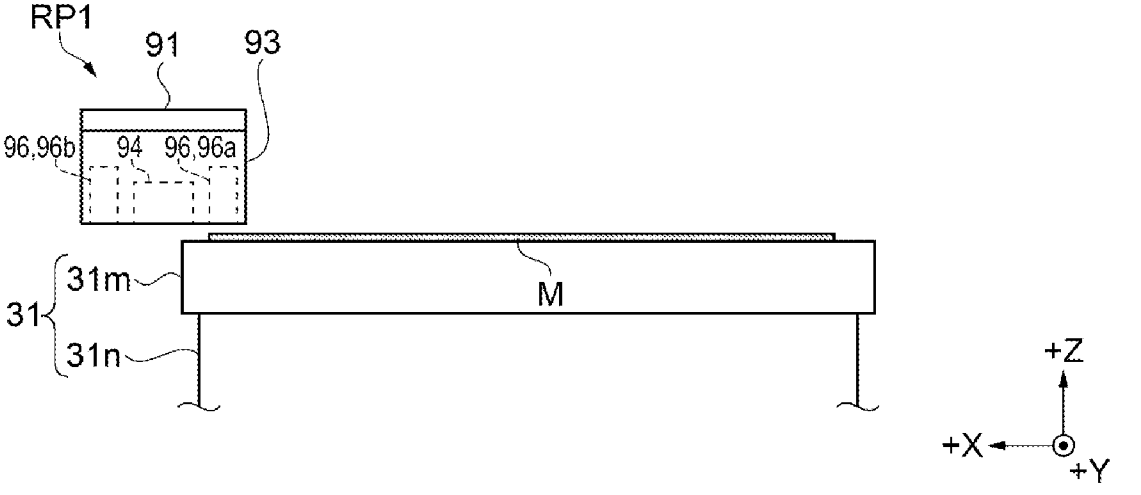
FIG. 11 is a diagram illustrating a state where the carriage is positioned at a first return position.

FIG. 11 illustrates a state where the carriage 91 is positioned at the first return position RP1. The first return position RP1 is a position in the first scanning direction SD1 with respect to the home position HP. The first return position RP1 is a position where the carriage 91 stops. The first return position RP1 is an example of the return position RP. The first return position RP1 corresponds to an example of a stop position. The print control portion 114 of the control unit 110 controls the carriage driving motor 82 to control a stop operation of the carriage 91. The carriage 91 temporarily stops at the first return position RP1, and then, moves in the second scanning direction SD2.

When the carriage 91 is positioned at the first return position RP1, the first UV-lamp 96*a* faces the printing medium M. The first return position RP1 is a position where the first UV-lamp 96*a* faces the printing medium M. The first UV-lamp 96*a* stops at a position where an end portion of the printing medium M in the +X direction can be irradiated with ultraviolet light emitted by the first UV-lamp 96*a*. The first UV-lamp 96*a* can irradiate the end portion of the printing medium M in the +X direction with ultraviolet light. At the first return position RP1, the printing head unit 94 is positioned at a position separated from a position facing the printing medium M. When the printing head unit 94 moves to the position separated from the position facing the printing medium M, the printing head unit 94 can print the end portion of the printing medium M in the +X direction.

When a position where the first UV-lamp 96*a* faces the printing medium M is selected as the first return position RP1 in the printer 100, it is possible to shorten a moving distance of the carriage 91 along the X-axis. By shortening the moving distance of the carriage 91 along the X-axis, it is possible to reduce a width of the printer 100 along the X-axis. Thus, a size of the printer 100 can be reduced.

Figure 12:
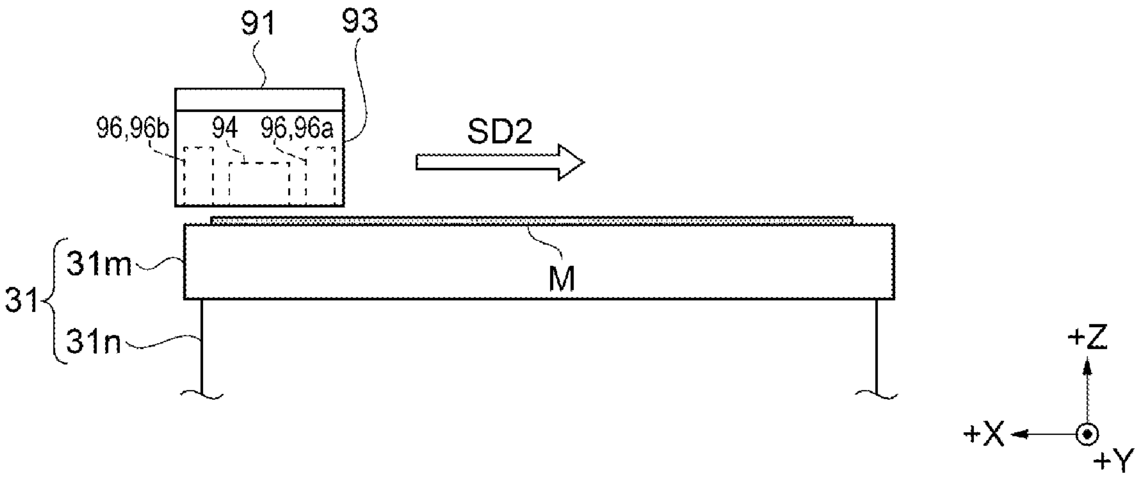
FIG. 12 is a diagram illustrating a state where the carriage is moving in a second scanning direction.

FIG. 12 illustrates a state where the carriage 91 is moving in the second scanning direction SD2. FIG. 12 illustrates a state where the carriage 91 is moving above the printing medium M in the second scanning direction SD2. The carriage 91 stops at the first return position RP1, and then, moves in the second scanning direction SD2. When the printing head unit 94 moves to a position facing the printing medium M, the printing head 95 of the printing head unit 94 ejects ink. The printer 100 causes the printing head 95 to eject ink to perform printing on the printing medium M. The printing head 95 performs printing on the printing medium M, until the carriage 91 moves to a second return position RP2. The second UV-lamp 96*b* emits ultraviolet light, before moving to a position facing the printing medium M. When the second UV-lamp 96*b* moves to the position facing the printing medium M, the second UV-lamp 96*b* irradiates the printing medium M with ultraviolet light. The second UV-lamp 96*b* emits ultraviolet light, until the carriage 91 moves to the second return position RP2.

Figure 13:
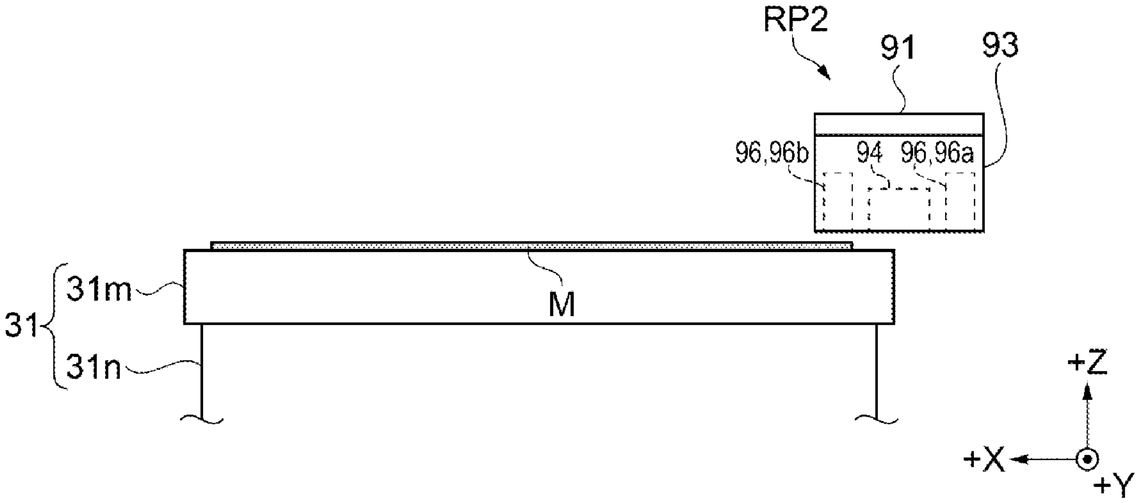
FIG. 13 is a diagram illustrating a state where the carriage is positioned at a second return position.

FIG. 13 illustrates a state where the carriage 91 is positioned at the second return position RP2. The second return position RP2 is a position different from the home position HP. The second return position RP2 is a position in the first scanning direction SD1 with respect to the home position HP. The second return position RP2 is a position where the carriage 91 stops. The second return position RP2 corresponds to an example of a second stop position. The print control portion 114 of the control unit 110 controls the carriage driving motor 82 to control a stop operation of the carriage 91. The carriage 91 temporarily stops at the second return position RP2, and then, moves in the first scanning direction SD1. The print control portion 114 controls the carriage driving motor 82 to move the carriage 91 in the first scanning direction SD1.

When the carriage 91 is positioned at the second return position RP2, the second UV-lamp 96*b* faces the printing medium M. The second return position RP2 is a position where the second UV-lamp 96_b_ faces the printing medium M. The second UV-lamp 96_b_ stops at a position where an end portion of the printing medium M in the −X direction can be irradiated with ultraviolet light emitted by the second UV-lamp 96_b_. The second UV-lamp 96_b_ can irradiate the end portion of the printing medium M in the −X direction with ultraviolet light. At the second return position RP2, the printing head unit 94 is positioned at a position separated from a position facing the printing medium M. When the printing head unit 94 moves to the position separated from the position facing the printing medium M, the printing head unit 94 can print the end portion of the printing medium M in the −X direction.

The printer 100 includes the second UV-lamp 96_b_ that is mounted to the carriage 91 and configured to emit ultraviolet light. The second UV-lamp 96_b_ is placed at a position in the first scanning direction SD1 with respect to the printing head unit 94.

The printer 100 can irradiate the printing medium M with ultraviolet light, when the carriage 91 is moving in the first scanning direction SD1 and when the carriage 91 is moving in the second scanning direction SD2.

The print control portion 114 controls the carriage driving motor 82 to move the carriage 91 stopped at the first return position RP1 in the second scanning direction SD2, which is a reverse direction to the first scanning direction SD1, to the second return position RP2 where the second UV-lamp 96_b_ faces the printing medium M and the printing head unit 94 does not face the printing medium M, and then, moves the carriage 91 from the second return position RP2 in the first scanning direction SD1.

At the second return position RP2, the moving direction of the carriage 91 is switched from the second scanning direction SD2 to the first scanning direction SD1. The printer 100 can increase a printing velocity.

Figure 14:
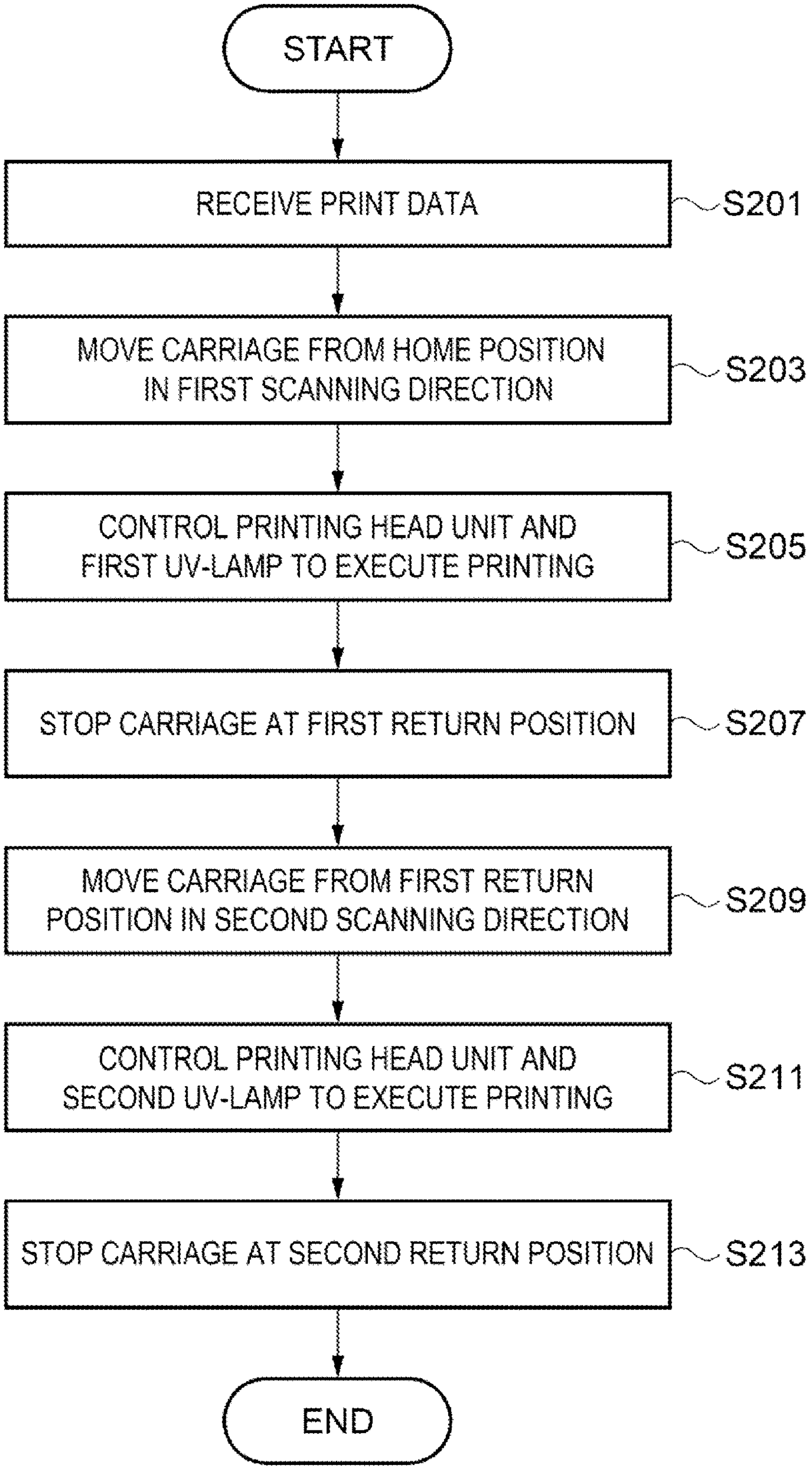
FIG. 14 is a diagram illustrating a flowchart of a printing operation by the printer.

FIG. 14 illustrates a flowchart of a printing operation by the printer 100. FIG. 14 illustrates a control method of the printer 100. FIG. 14 illustrates a control method of the printer 100 according to the second embodiment.

In step S201, the printer 100 receives print data. The communication interface 123 receives print data transmitted from the computer 200. The communication interface 123 transmits the received print data to the data processing portion 112. The data processing portion 112 processes the received print data to generate print control data that can be processed by the printer 100. The data processing portion 112 transmits the generated print control data to the print control portion 114. The print control portion 114 receives the print control data.

In step S203, after receiving the print data, the printer 100 moves the carriage 91 from the home position HP in the first scanning direction SD1. The print control portion 114 rotationally drives the carriage driving motor 82, based on the print control data. The carriage 91 stands by in advance at the home position HP. The print control portion 114 rotationally drives the carriage driving motor 82 to move the carriage 91 from the home position HP in the first scanning direction SD1.

The printer 100 moves the carriage 91 from the home position HP in the first scanning direction SD1, and then, the printer 100 executes printing in step S205. When the printing head unit 94 mounted to the carriage 91 moves to a position facing the printing medium M, the printing head 95 of the printing head unit 94 ejects ink. The ink to be ejected is an ultraviolet-curable ink. The printing head 95 ejects ink, based on the print control data. The printer 100 causes the printing head 95 to eject ink to execute printing. The print control portion 114 controls the printing head unit 94 and the carriage driving motor 82 to cause the printing head 95 to execute printing. The print control portion 114 causes the first UV-lamp 96_a_ to emit ultraviolet light, before the first UV-lamp 96_a_ faces the printing medium M. When the first UV-lamp 96_a_ moves to a position facing the printing medium M, the first UV-lamp 96_a_ irradiates the printing medium M with ultraviolet light. The print control portion 114 controls a start timing of the ultraviolet irradiation by the first UV-lamp 96_a_ and the light amount of the ultraviolet irradiation. The print control portion 114 controls the second UV-lamp 96_b_. When the carriage 91 moves in the first scanning direction SD1, the print control portion 114 does not cause the second UV-lamp 96_b_ to emit ultraviolet light.

After executing printing, the printer 100 stops the carriage 91 at the first return position RP1 in step S207. The print control portion 114 decelerates the carriage 91, before the carriage 91 reaches the first return position RP1. The print control portion 114 controls the carriage driving motor 82 to decelerate the carriage 91. When the printing head unit 94 moves to a position separated from the position facing the printing medium M, the print control portion 114 stops the ejection of ink. The print control portion 114 controls the carriage driving motor 82 to stop the carriage 91 at the first return position RP1. The first return position RP1 is a position where the first UV-lamp 96_a_ faces the printing medium M.

After the carriage 91 stops at the first return position RP1, the printer 100 moves the carriage 91 from the first return position RP1 in the second scanning direction SD2 in step S209. The print control portion 114 controls the carriage driving motor 82 to move the carriage 91 in the second scanning direction SD2.

After moving the carriage 91 in the second scanning direction SD2, the printer 100 executes printing in step S211. When the printing head unit 94 mounted to the carriage 91 is positioned at a position facing the printing medium M, the printing head 95 of the printing head unit 94 ejects ink. The printing head 95 ejects ink, based on the print control data. The printer 100 causes the printing head 95 to eject ink to execute printing. The print control portion 114 controls the printing head unit 94 and the carriage driving motor 82 to cause the printing head 95 to execute printing. The print control portion 114 causes the second UV-lamp 96_b_ to emit ultraviolet light, before the second UV-lamp 96_b_ faces the printing medium M. When the second UV-lamp 96_b_ moves to the position facing the printing medium M, the second UV-lamp 96_b_ irradiates the printing medium M with ultraviolet light. The print control portion 114 controls a start timing of the ultraviolet irradiation by the second UV-lamp 96_b_ and the light amount of the ultraviolet irradiation. The print control portion 114 controls the first UV-lamp 96_a_. When the carriage 91 is moving in the second scanning direction SD2, the print control portion 114 does not cause the first UV-lamp 96_a_ to emit ultraviolet light.

After executing printing, the printer 100 stops the carriage 91 at the second return position RP2 in step S213. The print control portion 114 decelerates the carriage 91, before the carriage 91 reaches the second return position RP2. The print control portion 114 controls the carriage driving motor 82 to decelerate the carriage 91. When the printing head unit 94 moves to a position separated from the position facing the printing medium M, the print control portion 114 stops the ejection of ink. The print control portion 114 controls the carriage driving motor 82 to stop the carriage 91 at the second return position RP2. The second return position RP2 is a position where the second UV-lamp 96*b* faces the printing medium M.

What is claimed is:

1. A printing apparatus comprising:

a printing head configured to eject photocurable ink onto a medium;

a first irradiation portion configured to perform light irradiation of the medium;

a mounting portion mounted with the first irradiation portion and the printing head in order from the first irradiation portion to the printing head along a first direction; and a driving portion configured to move the mounting portion between a standby position where the printing head stands by and a stop position in the first direction with respect to the standby position;

a support portion that supports the medium; and a guide shaft along the first direction that guides the mounting portion from the standby position to the stop position, wherein the stop position is a position where the first irradiation portion faces the medium and the printing head does not face the medium, a length of the portion of the guide shaft extending beyond the support portion in the first direction is shorter than a length of the mounting portion in the first direction, and longer than a length of the printing head in the first direction, and an edge of the first irradiation portion on a print head side and an edge of the medium are placed in same position in the first direction when the mounting portion is in the stop position.

2. The printing apparatus according to claim 1, further comprising a control portion configured to control the driving portion and the first irradiation portion.

3. The printing apparatus according to claim 2, wherein the control portion causes the first irradiation portion to stop the light irradiation before the mounting portion stops at the stop position.

4. The printing apparatus according to claim 2, wherein the control portion causes the first irradiation portion to reduce a light amount of the light irradiation before the mounting portion stops at the stop position.

5. The printing apparatus according to claim 2, further comprising a second irradiation portion mounted to the mounting portion and configured to perform the light irradiation, wherein the second irradiation portion is mounted at a position in the first direction of the printing head.

6. The printing apparatus according to claim 5, wherein the control portion:

controls the driving portion to move the mounting portion stopped at the stop position in a second direction being a reverse direction of the first direction and after moving the mounting portion to a second stop position where the second irradiation portion faces the medium and the printing head does not face the medium, moves the mounting portion from the second stop position in the first direction.

7. The printing apparatus according to claim 6, wherein an edge of the second irradiation portion on a print head side and an edge of the medium are placed in same position in the first direction when the mounting portion is in the second stop position.

8. The printing apparatus according to claim 1, wherein the printing head ejects a plurality of types of the photocurable ink onto the medium and the plurality of types of photocurable ink include clear ink.

9. The printing apparatus according to claim 1, wherein a length of the guide shaft beyond the support portion in the second direction is shorter than a length of the mounting portion in the second direction.

10. The printing apparatus according to claim 1, wherein the length of the portion of the guide shaft extending beyond the support portion in the first direction is longer than a sum of a length of the printing head and a length of the first irradiation portion in the first direction.

11. A method of controlling a printing apparatus, the printing apparatus including:

a support portion that supports a medium;

a mounting portion mounted with an irradiation portion and a printing head in order from the irradiation portion to the printing head along a first direction; and a guide shaft along the first direction that guide the mounting portion from a standby position to a stop position, wherein the printing apparatus being configured to eject photocurable ink onto the medium, a length of the guide shaft beyond the support portion in the first direction is shorter than a length of the mounting portion in the first direction, and longer than a length of the printing head in the first direction, the method comprising:

moving the mounting portion from the standby position in the first direction; and passing the mounting portion above the medium and stopping the mounting portion at the stop position where the irradiation portion mounted to the mounting portion faces the medium, wherein an edge of the irradiation portion on a print head side and an edge of the medium are placed in same position in the first direction when the mounting portion is in the stop position.

* * * * *